Jan. 12, 1971  H. DEICHELMANN  3,555,414
METHOD AND APPARATUS FOR DETECTING FAULTS IN THE ENAMEL
COATING OF A VESSEL HAVING ELECTRICALLY CONDUCTIVE
TANTALUM PLUGS WHEREIN A PASSIVATING INSULATING
LAYER IS FORMED ON THE PLUGS
Filed Jan. 21, 1969
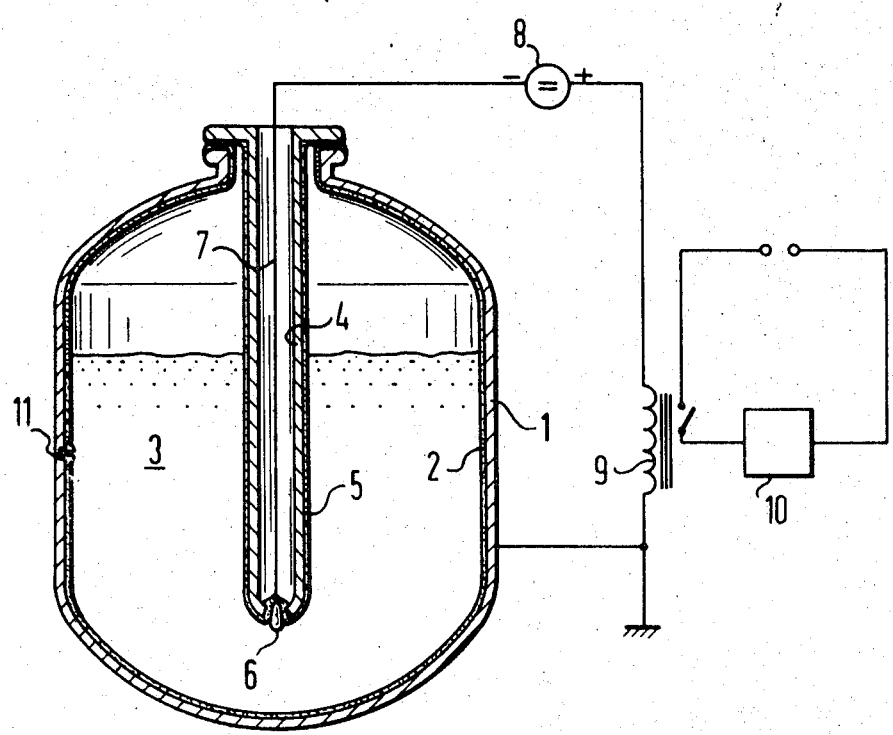
Hermann Deichelmann,
Inventor

United States Patent Office 3,555,414
Patented Jan. 12, 1971

3,555,414
METHOD AND APPARATUS FOR DETECTING FAULTS IN THE ENAMEL COATING OF A VESSEL HAVING ELECTRICALLY CONDUCTIVE TANTALUM PLUGS WHEREIN A PASSIVATING INSULATING LAYER IS FORMED ON THE PLUGS
Hermann Deichelmann, Schwetzingen, Germany, assignor to Pfaudler-Werke AG, Schwetzingen, Germany, a corporation of Germany
Filed Jan. 21, 1969, Ser. No. 794,475
Claims priority, application Germany, Jan. 24, 1968, 1,648,662
Int. Cl. G01r 31/12
U.S. Cl. 324—54
4 Claims

ABSTRACT OF THE DISCLOSURE

Faults in the enamel coating of vessels which have electrically conductive tantalum plugs extend through the walls of the vessel, and adapted to hold electrically conductive liquids, are detected by introducing into the vessel an exposed electrode, and connecting the electrode and the metal wall of the enameled vessel to the negative, and positive terminal, respectively, of an electrical direct current circuit which includes a current sensitive relay. Upon connection, a passivating, insulating layer is formed on the tantalum plugs. Remaining leakage current is balanced out and additional current due to breakdown in enamel is detected by changes in current in the circuit, causing the relay to respond.

---

The present invention relates to a method to electrically determine damage to corrosion inhibiting enamel layers applied to electrically conductive support material of enameled apparatus, having built-in elements, or repair parts made of tantalum, in which a low direct current voltage is applied between an electrode within an electrically conductive substance in the apparatus and the support material; and to an indicator device to indicate intensity of current and thus to determine damage to the apparatus.

A number of electrical test apparatus are known with which damage to an electrically insulating covering layer on an electrically conductive support can be determined. Such known methods are not, however, suitable to test enameled layers of chemical apparatus being subjected to substantial corrosion attack, since repairs to the enameled layers of such apparatus by means of tantaum repair units would simulate damage to the enameled layer itself (see, for example, German Pat. 727,042); tests of large enameled apparatus, or of enameled stubs, of small diameter (see German GM 1,951,708) do not appear practically possible. The previously utilized methods to test corrosion resistant enameled layers in actual use (such as visual testing, test by fluxes, wetting tests, and high tension tests) have the disadvantage that apparatus and accessories can be tested only before being placed in use, or during an interruption in production processes.

Enameled apparatus are used frequently in processes which place high requirements on the resistance to corrosion, and which may extend for an appreciable period of time. Possible damage to the enameled layer could not be determined during the time that processing is carried out. As a result of damage which could not be determined, corrosion of the support material may ensue which, depending on the type and time of the attack may cause complete penetration of the wall of the vessel, or the like. If mechanical damage to the enameled layer is detected in time, that is, before the support material is substantially impaired, repair can be done immediately and in place, in most cases by means of a tantalum screw. If the damage, however, is not detected for some time, and the support material is substantially or completely destroyed, only a complete renewal of the covering layer of the apparatus by the manufacturer is usually possible, if entire replacement is not required.

It is an object of the present invention to provide a method to electrically determine damage to the enameled layer of an enameled apparatus, so that damage arising during operation can be immediately determined by changes in a current level without, however, relinquishing the use of built-in elements or of repair parts made of tantalum.

SUBJECT METHOD OF THE PRESENT INVENTION

Before the system is used, but after the apparatus is filled with a production substance (which is electrically conductive), the free surface of built-in elements or repair elements of tantalum are, by connection to the positive pole, of a direct current source of low potential, covered by an electrically insulating passivating layer. An electrically conductive connection to the support material is made; the same voltage source also furnishes power to indicate faults. By this method in spite of the presence of built-in elements and repair pieces of tantalum, damage to the enameled layer can be determined during operation.

Iron acceptance into the production substance can be determined immediately. In many cases it could happen that the entire charge of the vessel becomes worthless if the production substance is contaminated by iron. By the use of the invention, enameled apparatus can be more widely used, since, in certain cases, enameled apparatus could not previously be utilized in spite of the other advantages due to the danger of mechanical damage to the enameled layer.

The single figure illustrates an example of a device to carry out the process of the invention, and will be used as the basis for the explanation thereof.

A vessel 1 having an outer housing made of steel is covered at its inner side by an enameled layer 2. Faults in the enameled layer which may be present can be covered by a tantalum screw 11, if necessary, supplied with a sealing ring made of polytetrafluorethylene. The chamber 3 formed by the vessel, filled with an electrically conductive substance, has a tubular insert part 4 extending therein, the outside of which is likewise covered with an enameled layer. The lower end of the part 4 is supplied with a metallic electrode 6 which is in electrically conductive connection with the substance in chamber 3. The metallic electrode is insulated from the metallic body of the insert part 4, e.g., by melting-in of the electrode, or its connecting conductor into an enameled layer. Instead of being enameled, the insert part 4 may also be supplied with an electrically passivated corrosion inhibiting protective layer.

An electric conductor 7 extends from the metallic electrode 6 in the hollow interior part 4 insulated from the metallic body, to the outside. This electric conductor is connected to the negative pole of a direct current source 8. The negative output voltage of the direct current source may be at least 0.5 volt, and the short circuit current may be at least 10 ma. Preferably, the potential is minus 16 volts and the short circuit current 100 ma. The positive pole of the direct current source is connected in electrically conductive relation to the outer wall of the steel vessel 1 over a current control switch 9. This current control switch, in the form of a relay, has at least two switching positions and an operating threshhold above 0.1 ma., possibly at about 30 ma. A signaling device, of any desired kind may be used as an indicator for an increase in current in the electrical circuit.

Normally, only a small quiescent current will flow in the closed circuit including source 8 so along as the enameled layer, and repair plugs of tantalum, or putty, are undamaged, since the enameled layer has a very high electrical resistance, and because the direct current source by anodic oxidation forms a tightly adhering passivating layer over the tantalum repair plug, which will then also act as a good insulator. Leakage currents flowing over stubs, putty joints and the like are small. If, however, the enameled layer is damaged, the product which, in all practical instances in which enameled vessels are used, is electrically conductive, comes into contact with the support material of the vessel, or the respective attachments thereof. The current will rise strongly in the circuit since the support material for enameled apparatus or the like cannot be passivated anodically. The support material is preferably steel. Rise in current in the circuit including the source 8 operates the relay coil of switch 9, which, in turn, controls the signaling device 10.

I claim:
1. Method of electrically determining faults in corrosion inhibiting enamel insulating coverings (2) applied over metallic, electrically conductive walls of a vessel (1), said vessel containing electrically conductive substance, and said vessel further having elements of tantalum (11) extending through the conductive walls of the vessel and into the substance, said method comprising:
   introducing a metallic electrode into the interior of said vessel and into said substances;
   applying a low DC potential between the wall of said vessel and the metallic electrode and of such polarity that the vessel wall will be positive with respect to the metallic electrode, and of such value that the surfaces of the tantalum elements exposed to said substance, and electrode, be passivated, and thus in-circuit formed by the vessel wall, tantalum plug, substance, and electrode, be passivated, and thus insulated and permitting, after passivation, flow of a residual small quiescent current only;
   and determining changes in quiescent current flow in said electrical circuit formed by said electrodes, said wall and said substances.

2. Method according to claim 1, including the step of adjusting the circuit, after initial connection and formation of the passivating layer on said tantalum elements to a quiescent current of less than 0.1 ma., said circuit having a maximum current limit of about 100 ma.; and connecting a current sensitive relay with a response threshold close to about 30 ma.

3. Covered enamel vessel with a fault detection system having an electrically conductive substance contained therein, the walls of said vessel being electrically conductive; elements of tantalum extending through the walls of said vessel and into said substance, comprising:
   an insulated element mounted to extend into said vessel;
   an electrode secured to said element and exposed to said substance to form an electrical connection thereto;
   an electrical DC circuit having its negative terminal conncted to said electrode and the positive terminal to said vessel;
   a current sensitive relay having its connecting element included in said circuit;
   and a detection circuit including a controlled element of said relay to indicate inreasing current in said DC circuit above a quiescent value if a fault occurs in the enamel covering of said vessel,
   said DC circuit including a source of sufficient voltage to cause a passivating layer to form over said tantalum metallic elements extending from the wall of said vessel and over said enamel cover, said passivating layer forming insulation over said tantalum elements where they are exposed to said conductive substance and permitting only a small quiescent current to flow through said circuit.

4. Combination of vessel and system according to claim 1, wherein the DC circuit is adjusted for a quiescent current of less than 0.1 ma., said circuit having a maximum current limit of 100 ma., and the current sensitive relay has a response threshold to close at about 30 ma.

References Cited

UNITED STATES PATENTS

| | | | |
|---|---|---|---|
| 3,069,620 | 12/1962 | Servos | 324—54 |
| 3,210,655 | 10/1965 | McGlasson et al. | 324—54 |
| 3,252,155 | 5/1966 | Surtees et al. | 324—54X |
| 3,414,808 | 12/1968 | Thomas | 324—54 |
| 3,417,327 | 12/1968 | Breidenbach | 324—54 |

GERARD R. STRECKER, Primary Examiner